W. J. BEHN.
UNIVERSAL JOINT.
APPLICATION FILED MAR. 8, 1917.
1,261,683.
Patented Apr. 2, 1918.
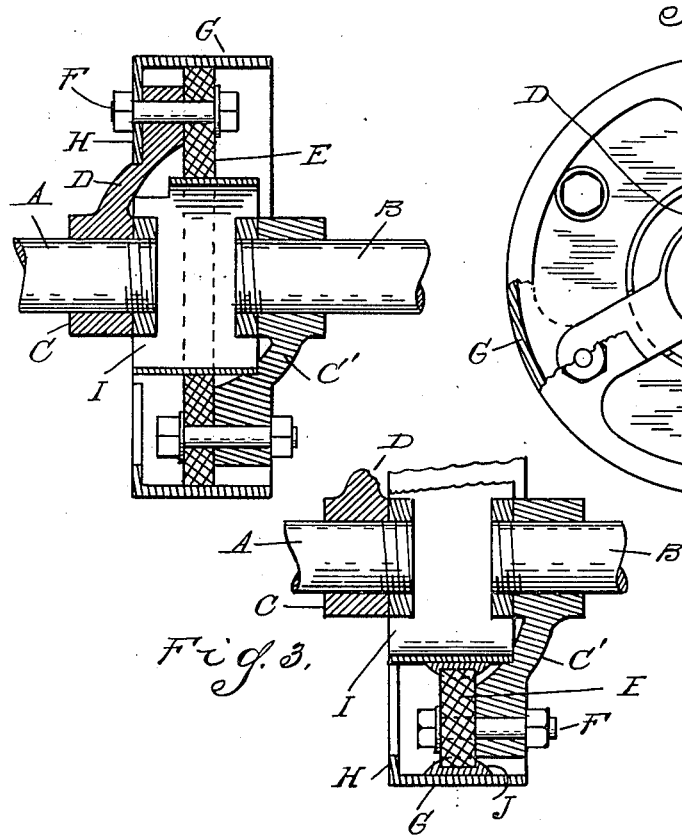
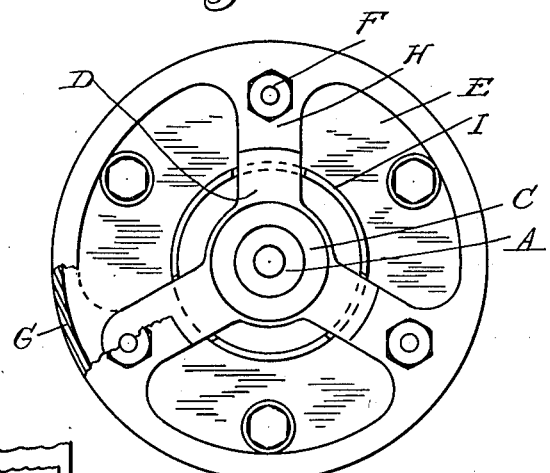
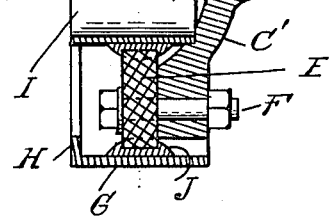
Inventor
Walter J. Behn
By Whittemore Hulbert & Whittemore
Attorneys

UNITED STATES PATENT OFFICE.

WALTER J. BEHN, OF DETROIT, MICHIGAN.

UNIVERSAL JOINT.

1,261,683.          Specification of Letters Patent.          Patented Apr. 2, 1918.

Application filed March 8, 1917. Serial No. 153,260.

*To all whom it may concern:*

Be it known that I, WALTER J. BEHN, a citizen of the United States of America, residing at Detroit, in the county of Wayne and State of Michigan, have invented certain new and useful Improvements in Universal Joints, of which the following is a specification, reference being had therein to the accompanying drawings.

The invention relates to universal joints of that type in which the drive and driven members are connected to each other through the medium of a flexible annular disk. Joints of this character have proven satisfactory where the speed of revolution is not excessive, but for high speeds it has been found that there is a tendency to whip or vibrate, which is objectionable. To overcome this objection I have devised a construction which, without in any way interfering with the flexibility of the joint, holds the same from vibration, the construction being as hereinafter set forth.

In the drawings:

Figure 1 is a longitudinal section through the joint;

Fig. 2 is an elevation partly broken away;

Fig. 3 is a sectional detail similar to Fig. 1 showing a slight modification.

A and B are the drive and driven shaft sections, provided with heads C and C' having a plurality of radially-extending arms D. The arms of the two heads are staggered in relation to each other, and intermediate these arms is arranged the annular flexible disk E. F are clamping bolts which secure the disk to the arms and through which the torque is transmitted.

The construction as thus far described has heretofore been used, and, as above stated, is satisfactory for the transmission of power at a low rate of speed. Where the shafts are misalined or in angular relation to each other the disk E will be flexed laterally, but the tensile strength is sufficient to transmit the torque from the arms of one head to those of the other. There is not, however, anything in the construction as thus far described to prevent a radial movement of portions of the disk or the distortion of the disk from its circular form. Consequently when the speed is increased the periodic vibrations which will be set up have a tendency to bring about such a distortion, with a result that there is a whipping action of the driven member.

My improvement comprises essentially the provision of means for overcoming the radial movement or the distortion of the disk radially. This may be accomplished by a rigid member adjacent to the margin of the disk, arranged either inside or outside of the same, but preferably both inside and outside. It is essential that this rigid retaining member should not interfere with the flexing of the disk laterally with respect to its plane of rotation, but it is desirable to hold the disk concentric with the axis of at least one of the shaft members. In the specific construction illustrated, I have provided a cylindrical retainer G which surrounds the disk and is in contact with the periphery thereof. This retainer is secured to the radial arms of one of the heads C by suitable means, such as the inwardly-extending lugs H, which are clamped to said arms by the same bolts F employed for securing the disks. The construction is also provided with an inner cylindrical retainer I bearing against the inner edge of the disk and rigidly mounted upon the opposite head C'. In operation, the disk is free to flex laterally between the inner and outer retainers G and I, which are held in substantially concentric relation, but all radial distortion is prevented by impingement of the margin of the disk against the rigid cylindrical surfaces.

In the modified construction shown in Fig. 3, I have provided the disk E with a shoe J upon the edge thereof, which forms the bearing contacting with the surface of the retainer. This shoe may be formed of material adapted to withstand the wear produced by frictional contact with the retainer during the lateral flexing of the disk, and will thus increase the length of life of the structure.

What I claim as my invention is:

1. In a universal joint, the combination with drive and driven members, a flexible disk therebetween and staggered arms on said drive and driven members attached to said disk, of means for holding said disk from radial distortion, permitting freedom for lateral deflection.

2. In a universal joint, the combination with drive and driven members having staggered arms, of a flexible disk forming a torque connection therebetween, and a rigid member contacting with the edge of said disk and holding the same from radial distortion.

3. In a universal joint, the combination with drive and driven members having staggered arms, of a flexible disk forming a torque connection therebetween, and a rigid member in contact with the edge of said disk and secured to one of said drive and driven members.

4. In a universal joint, the combination with drive and driven members having staggered arms, of a flexible annular disk forming a torque connection therebetween, and inner and outer rigid members respectively contacting with the inner and outer edges of said disk and holding the same from radial distortion.

5. In a universal joint, the combination with drive and driven members, radial arms extending from said members in staggered relation to each other and an annular flexible disk connected to said arms and forming a torque connection therebetween, of a rigid member secured to the arms of one of said drive and driven members and in contact with one edge of said disk, to hold the same from radial distortion.

6. In a universal joint, the combination with drive and driven members, radial arms projecting from said members in staggered relation and a flexible annular disk secured to said arms and forming a torque connection therebetween, of outer and inner rigid members respectively contacting with the outer and inner edges of said disk and secured to the arms of the respective drive and driven members.

7. In a universal joint, the combination with drive and driven members and a flexible annular disk forming a torque connection therebetween, of a rigid member adjacent to an edge of said disk, and a shoe secured to the edge of the disk in slidable contact with said rigid member.

8. In a universal joint, the combination with drive and driven members, of a flexible disk forming a torque connection therebetween, fastenings attaching said members to the disk, disposed substantially equidistant from its center, those attaching one of the members being alternated with those attaching the other, and means for holding the disk from radial distortion.

9. In a universal joint, the combination with drive and driven members, of a flexible disk forming a torque connection therebetween, angularly spaced fastenings attaching said members to the disk, and means for holding the disk from radial distortion, permitting lateral movement of the disk.

10. In a universal joint, the combination with drive and driven members, of a flexible disk forming a torque connection therebetween, circumferentially spaced fastenings between the respective drive and driven members and the disk, and means carried by one of said members for holding the disk from radial distortion.

In testimony whereof I affix my signature.

WALTER J. BEHN.